(12) United States Patent
Kobashi et al.

(10) Patent No.: US 10,410,796 B2
(45) Date of Patent: Sep. 10, 2019

(54) SOLID ELECTROLYTIC CAPACITOR (71) Applicant: Panasonic Intellectual Property Management Co., Ltd., Osaka (JP)

(72) Inventors: Mikio Kobashi, Osaka (JP); Masanori Kashihara, Saga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/919,828

(22) Filed: Mar. 13, 2018

(65) Prior Publication Data

US 2018/0204681 A1    Jul. 19, 2018

Related U.S. Application Data (63) Continuation of application No. PCT/JP2016/004365, filed on Sep. 28, 2016.

(30) Foreign Application Priority Data

Sep. 30, 2015  (JP) .................. 2015-195045

(51) Int. Cl.
*H01G 9/025* (2006.01)
*H01G 9/15* (2006.01)
(Continued)

(52) U.S. Cl.
CPC .............. *H01G 9/10* (2013.01); *H01G 9/012* (2013.01); *H01G 9/15* (2013.01)

(58) Field of Classification Search
CPC .......... H01G 9/012; H01G 9/025; H01G 9/15; H01G 9/008
(Continued)

(56) References Cited

U.S. PATENT DOCUMENTS 6,493,214 B1  12/2002  Kanetake et al.
7,990,686 B2   8/2011  Matsuoka et al.
(Continued)

FOREIGN PATENT DOCUMENTS

CN      102420051 A    4/2012
CN      101533714 B   12/2013
(Continued)

OTHER PUBLICATIONS

International Search Report of PCT application No. PCT/JP2016/004365 dated Dec. 13, 2016.
(Continued)

*Primary Examiner* — Eric W Thomas
*Assistant Examiner* — Arun Ramaswamy
(74) *Attorney, Agent, or Firm* — McDermott Will & Emery LLP (57) ABSTRACT

A solid electrolytic capacitor includes a capacitor element including an anode portion and a cathode portion, an anode terminal electrically connected to the anode portion. The anode portion includes an anode body and an anode lead extending from the anode body. The anode terminal includes a first main surface and a second main surface opposite to the first main surface. The anode terminal includes a middle section, a first extension section and a second extension section, the first extension section and the second extension section being respectively disposed at both sides of the middle section. The first extension section has a first end part and is bent so that a tip of the first end part faces the second main surface. The second extension section has a second end part and is bent so that a tip of the second end part faces the second main surface. The anode lead connects with the first main surface of the anode terminal at the first end part and at the second end part.

10 Claims, 7 Drawing Sheets

(51) Int. Cl.
  *H01G 9/008* (2006.01)
  *H01G 9/012* (2006.01)
  *H01G 9/10* (2006.01)

(58) Field of Classification Search
  USPC .................................. 361/523, 528, 520, 538
  See application file for complete search history.

(56) References Cited

U.S. PATENT DOCUMENTS

2009/0231784 A1\* 9/2009 Matsuoka .............. H01G 9/012
  361/528
2012/0044615 A1  2/2012 Takahashi et al.
2012/0075775 A1  3/2012 Vyroubal

FOREIGN PATENT DOCUMENTS

JP  2001-028322  1/2001
JP  2012-043958  3/2012

OTHER PUBLICATIONS

English Translation of Chinese Search Report dated Jun. 5, 2019 for the related Chinese Patent Application No. 201680055911.1.

\* cited by examiner

SOLID ELECTROLYTIC CAPACITOR

RELATED APPLICATIONS

This application is a continuation of the PCT International Application No. PCT/JP2016/004365 filed on Sep. 28, 2016, which claims the benefit of foreign priority of Japanese patent application No. 2015-195045 filed on Sep. 30, 2015, the contents all of which are incorporated herein by reference.

BACKGROUND

1. Technical Field

The present disclosure relates to a solid electrolytic capacitor that is mounted to an electronic device.

2. Description of the Related Art

Solid electrolytic capacitors are used for various electronic devices because of their lower equivalent series resistance (ESR) and excellent frequency characteristics. As described in Unexamined Japanese Patent Publication No. 2012-043958, a solid electrolytic capacitor generally has a capacitor element that includes an anode portion and a cathode portion, a plate-shaped anode terminal electrically connected to the anode portion, a plate-shaped cathode terminal electrically connected to the cathode portion, and an exterior body that covers the capacitor element with the anode terminal and the cathode terminal partly exposed exteriorly. When mounted, the solid electrolytic capacitor is connected to a circuit board at its parts where the anode terminal and the cathode terminal are exposed. The anode portion includes an anode body and an anode lead that extends from the anode body. The anode body is, for example, a porous sintered body that is obtained by pressure-molding valve metal particles into a cube. The anode lead is implanted straight from substantially a center of one face of the anode body. As such, the anode lead and the plate-shaped anode terminal are generally connected via a connecting member.

Recently, as electronic devices become increasingly small and low-profile, the solid electrolytic capacitor also is required to be smaller in size in order to be mounted to the circuit board inside the electronic device. Size reduction of the solid electrolytic capacitor leads to a shorter distance between the anode lead and the anode terminal, so that the connecting member needs to be smaller. With the smaller connecting member, positioning with respect to the anode terminal and connection to the anode terminal are difficult, thus resulting in lower productivity. And it is also difficult to integrally form the anode terminal and the connecting member in high-precision. Accordingly, reliability of connection between the anode lead and the connecting member may decrease in some cases.

As such, further improvement is required of the solid electrolytic capacitor for achievement of both size reduction and productivity.

SUMMARY

A solid electrolytic capacitor of the present disclosure includes a capacitor element that includes an anode portion and a cathode portion, an anode terminal electrically connected to the anode portion, a cathode terminal electrically connected to the cathode portion, and an exterior body. The anode portion includes an anode body and an anode lead extending from the anode body. The exterior body covers the capacitor element and exposes at least a part of each of the anode terminal and the cathode terminal. The anode terminal has a first main surface and a second main surface opposite to the first main surface. The anode terminal includes a middle section, and a first extension section and a second extension section, the first extension section and the second extension section being respectively disposed at both sides of the middle section. The first main surface is exposed from the exterior body at the middle section. And each of the first extension section and the second extension section extends from the middle section in a direction nonparallel with an extending direction of the anode lead. The first extension section has a first end part and is bent so that a tip of the first end part faces the second main surface. The second extension section has a second end part and is bent so that a tip of the second end part faces the second main surface. The anode lead connects with the first main surface of the anode terminal at the first end part and at the second end part.

DETAILED DESCRIPTION OF EMBODIMENT

Figure 1:
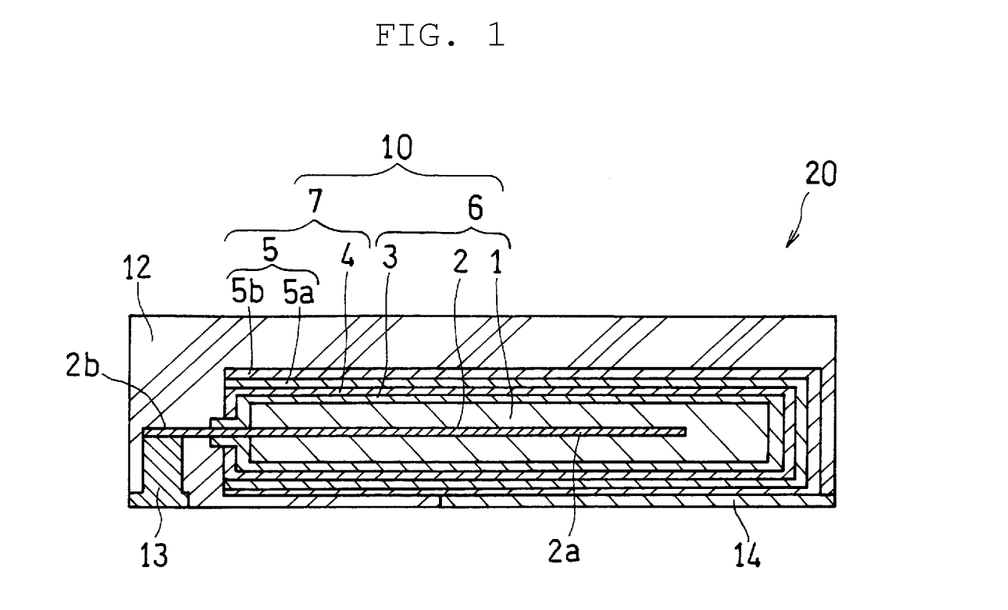
FIG. 1 is a sectional view schematically illustrating a solid electrolytic capacitor according to an exemplary embodiment of the present disclosure.
Figure 2A:
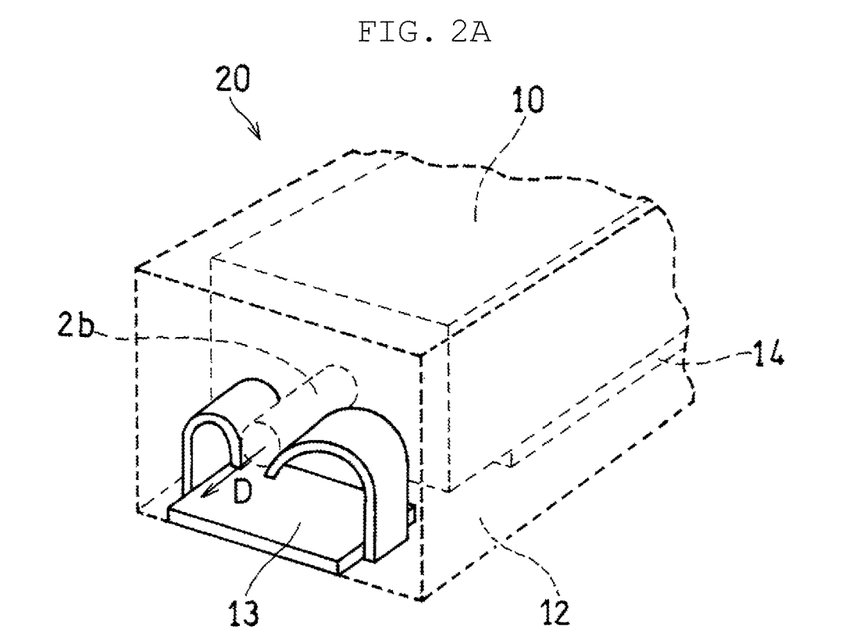
FIG. 2A is a perspective view schematically illustrating an essential part of the electrolytic capacitor of FIG. 1.
Figure 2B:
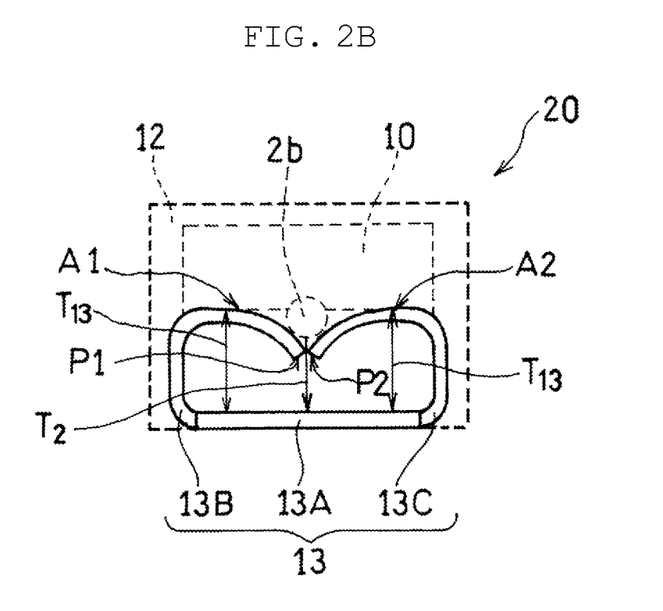
FIG. 2B is a side view schematically illustrating the essential part of the electrolytic capacitor of FIG. 1.

A solid electrolytic capacitor according to an exemplary embodiment of the present disclosure is described with reference to FIGS. 1, 2A, and 2B. FIG. 1 is a schematic sectional view illustrating solid electrolytic capacitor 20 according to the present exemplary embodiment. FIG. 2A is a perspective view schematically illustrating an essential part of electrolytic capacitor 20 of FIG. 1, and FIG. 2B is a side view as seen from anode terminal 13 in FIG. 1. It is to be noted that in FIGS. 2A and 2B, anode terminal 13 is indicated by solid lines, while other constituent elements are indicated by dashed lines for convenience sake.

<Solid Electrolytic Capacitor>

Solid electrolytic capacitor 20 includes capacitor element 10, exterior body 12, anode terminal 13, and cathode terminal 14. Capacitor element 10 includes anode portion 6 and cathode portion 7. Exterior body 12 seals capacitor element 10. Anode terminal 13 is electrically connected to anode portion 6 and is partly exposed from exterior body 12. Cathode terminal 14 is electrically connected to cathode portion 7 and is partly exposed from exterior body 12. This solid electrolytic capacitor 20 is manufactured by a method including steps below. The method of manufacturing solid electrolytic capacitor 20 includes a step of preparing capacitor element 10 having anode portion 6 and cathode portion 7, a step of connecting anode portion 6 and anode terminal 13, a step of connecting cathode portion 7 and cathode terminal 14, and a step of covering capacitor element 10 with exterior body 12.

Capacitor element 10 includes anode portion 6 that includes anode body 1 and anode lead 2, dielectric layer 3 formed on anode body 1, and cathode portion 7. Cathode portion 7 has solid electrolyte layer 4 formed on dielectric layer 3, and cathode layer 5 covering a surface of solid electrolyte layer 4.

<Anode Portion>

In the present exemplary embodiment, anode portion 6 includes anode body 1 and anode lead 2 that extends from a face of anode body 1 and is electrically connected to anode terminal 13.

Anode body 1 is, for example, a porous sintered body of a rectangular parallelepiped shape that is obtained by sintering metal particles. Valve metal particles used as the above metal particles include titanium (Ti), tantalum (Ta), and niobium (Nb). One or not less than two kinds of metal particles are used for anode body 1.

Anode lead 2 is formed of, for example, a conductive wire. Materials that can be used for anode lead 2 include the above-described valve metals but are not limited to these. Anode lead 2 has first part 2a that is embedded into anode body 1 from a face of anode body 1, and second part 2b that extends from the face of anode body 1. Anode portion 6 is made, for example, by pressure-molding the metal particles into a rectangular parallelepiped with first part 2a embedded within the metal particles in powder form and sintering the metal particles. Second part 2b is joined to anode terminal 13 by welding. In this way, anode lead 2 is electrically connected to anode terminal 13.

Dielectric layer 3 is formed on a surface of anode body 1. Dielectric layer 3 is formed of, for example, metal oxide. Examples of a method of forming a metal-oxide-containing layer on the surface of anode body 1 include a method of anodizing the surface of anode body 1 with anode body 1 immersed in an anodizing solution and a method of heating anode body 1 under an oxygen-containing atmosphere. Dielectric layer 3 is not limited to the metal-oxide-containing layer as long as dielectric layer 3 has insulation property.

<Cathode Portion>

Cathode portion 7 has solid electrolyte layer 4 formed on dielectric layer 3, and cathode layer 5 covering solid electrolyte layer 4.

Solid electrolyte layer 4 has only to be formed so as to cover at least a part of dielectric layer 3. Examples that can be used for solid electrolyte layer 4 include a manganese compound and a conductive polymer. Examples of the conductive polymer that can be used include polypyrrole, polyaniline, polythiophene, and their derivatives. Solid electrolyte layer 4 containing the conductive polymer is formed, for example, by polymerization of a raw material monomer on dielectric layer 3. Alternatively, solid electrolyte layer 4 is formed by application of a solution containing the conductive polymer to dielectric layer 3. Solid electrolyte layer 4 is formed of one or two or more solid electrolyte layers. In cases where solid electrolyte layer 4 is formed of two or more layers, these layers may, for example, have different conductive polymer compositions, respectively, and may be formed (polymerized) by different methods, respectively.

Cathode layer 5 includes, for example, carbon layer 5a that is formed to cover solid electrolyte layer 4, and metal paste layer 5b that is formed on a surface of carbon layer 5a. Carbon layer 5a contains conductive carbon material, such as graphite, and resin. Metal paste layer 5b contains, for example, metal particles (e.g., silver) and resin. It is to be noted that cathode layer 5 is not limited to this structure. Cathode layer 5 has only to structurally have a current collecting function. Cathode layer 5 is formed, for example, by sequential application of carbon layer 5a and metal paste layer 5b over solid electrolyte layer 4.

<Cathode Terminal>

Cathode terminal 14 is electrically connected to cathode portion 7. Cathode terminal 14 is not particularly limited as long as cathode terminal 14 is formed of conductive material (a conductor). Cathode terminal 14 is not particularly limited in its shape, and for example, has a plate shape. Cathode terminal 14 has a thickness of, for example, between 25 μm and 100 μm, inclusive. Cathode terminal 14 may be electrically connected to cathode portion 7 via a conductive adhesive (not shown).

<Exterior Body>

Exterior body 12 is provided for electrical insulation between anode terminal 13 and cathode terminal 14 and thus is formed of insulating material. Exterior body 12 contains, for example, thermosetting resin that is cured. Examples of the thermosetting resin include epoxy resin, phenol resin, silicone resin, melamine resin, urea resin, alkyd resin, polyurethane, polyimide, and unsaturated polyester.

Exterior body 12 is formed, for example, by transfer molding or compression molding after placement of the thermosetting resin and capacitor element 10, to which anode terminal 13 and cathode terminal 14 are connected, in a mold. This is when capacitor element 10 is covered by exterior body 12 with anode terminal 13 and cathode terminal 14 having their respective surfaces exposed from exterior body 12. Exterior body 12 has the outside shape of, for example, a rectangular parallelepiped. The respective exposed surfaces of anode terminal 13 and cathode terminal 14 are formed at the same face of exterior body 12 of a rectangular parallelepiped shape.

<Anode Terminal>

Anode terminal 13 according to the present exemplary embodiment functions as a connecting member. Anode terminal 13 is formed, for example, by bending of a strip-shaped conductor (strip member).

Anode terminal 13 includes first main surface S1 and second main surface S2 opposite to first main surface S1. Anode terminal 13 includes middle section 13A where first main surface S1 is exposed from exterior body 12, first extension section 13B that extends from one end of middle section 13A in a direction nonparallel with extending direction D of second part 2b, and second extension section 13C that extends from another end of middle section 13A in a direction nonparallel with extending direction D of second part 2b. The nonparallel direction refers to, for example, a direction perpendicular to extending direction D of second part 2b. First extension section 13B has an end part (first end part) positioned opposite to a part that connects with middle section 13A. The first end part includes first tip P1. Second extension section 13C has an end part (second end part) positioned opposite to a part that connects with middle section 13A. The second end part includes second tip P2. First extension section 13B and second extension section 13C are bent with first main surface S1 facing outward. Moreover, first extension section 13B and second extension section 13C are bent with first tip P1 and second tip P2 facing second main surface S2 of middle section 13A. In this case, middle section 13A is generally plate-shaped. It is to be noted that first extension section 13B and second extension section 13C may be bent with first tip P1 and second tip P2 facing second main surface S2 of first extension section 13B or second extension section 13C. The first end part and the second end part are connected to second part 2b of anode lead 2 at first main surface S1.

Figure 3:
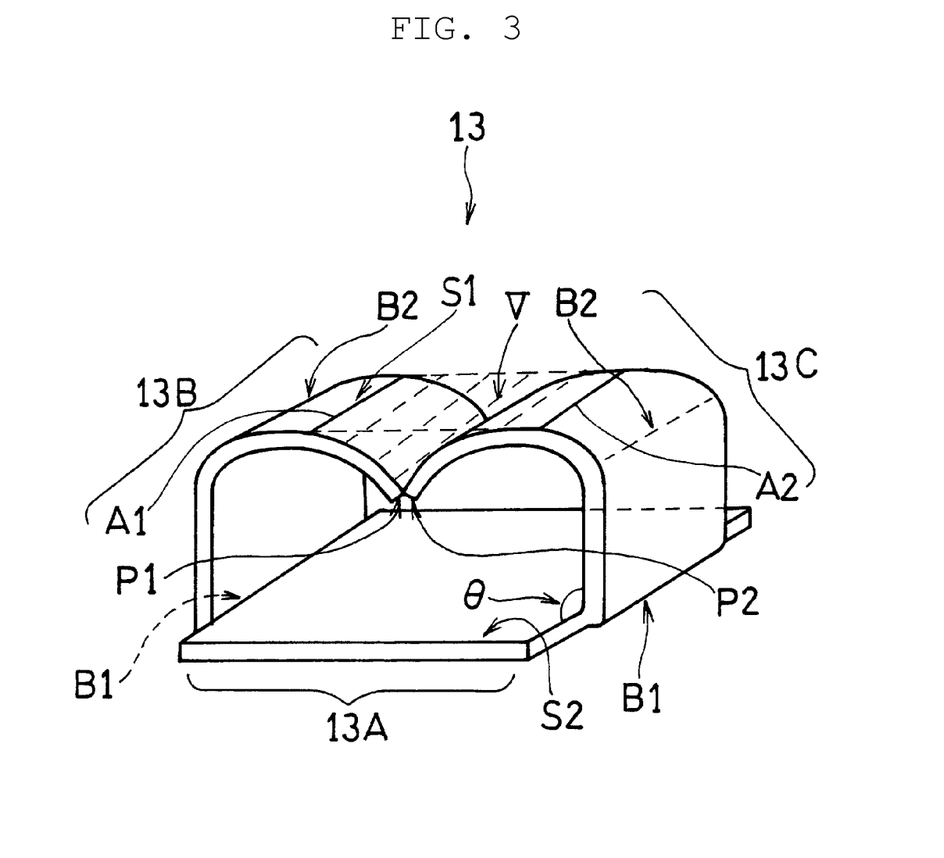
FIG. 3 is a perspective view illustrating an example of an anode terminal according to the exemplary embodiment of the present disclosure.
Figure 4A:
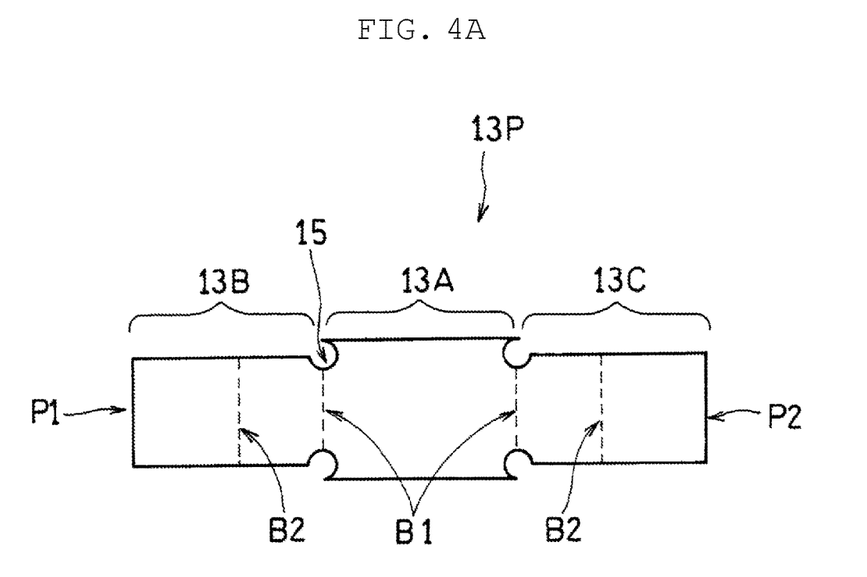
FIG. 4A is a top view illustrating the example of the anode terminal before bending.
Figure 4B:
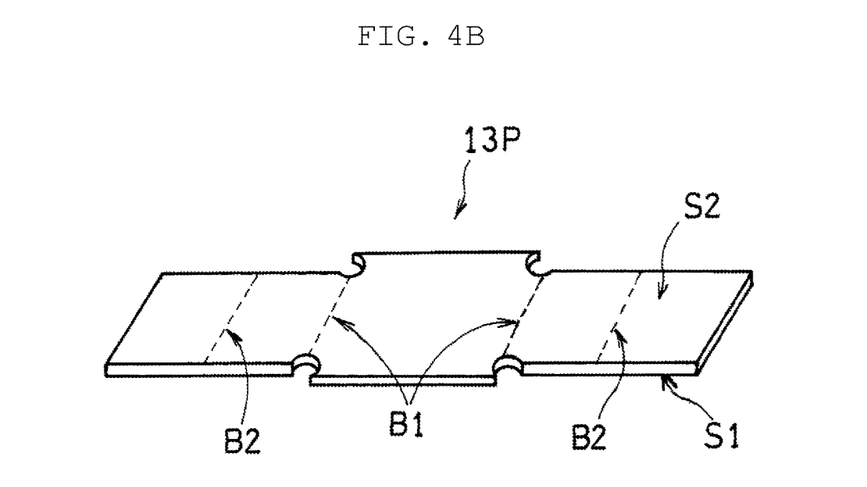
FIG. 4B is a perspective view illustrating the example of the anode terminal before the bending.

Anode terminal 13 is detailed further with reference to FIGS. 3, 4A, and 4B. FIG. 3 is a perspective view illustrating an example of anode terminal 13. FIG. 4A is a top view illustrating the example of anode terminal 13 (strip member 13P) before bending, and FIG. 4B is a perspective view illustrating the example of anode terminal 13 (strip member 13P) before the bending.

Anode terminal 13 includes valley V formed by first main surface S1 of the first end part and first main surface S1 of second end part which face each other. In other words, valley V is a space formed by joining of the first end part and the second end part at first main surface S1. Second part 2b is welded to anode terminal 13 at valley V for electrical connection.

Here, the first end part is defined as follows. A point is taken on first main surface S1. This point is nearest to first tip P1, and at this point, distance T13 (refer to FIG. 2B) is maximum between first main surface S1 of first extension section 13B and second main surface S2 of middle section 13A along a normal direction to second main surface S2 of middle section 13A (with a straight line that includes this point and is parallel to extending direction D of second part 2b being represented by straight line A1: refer to FIG. 3). A plane parallel to extending direction D of second part 2b, which includes a straight line extending through this point along the normal direction to second main surface S2 of middle section 13A, is regarded as an interface (not shown). Among two regions of first extension section 13B which are separated by this interface, the region including first tip P1 corresponds to the first end part.

Similarly to the first end part, the second end part is defined as follows. A point is taken on first main surface S1. This point is nearest to second tip P2, and at this point, distance T13 (refer to FIG. 2B) between first main surface S1 of second extension section 13C and second main surface S2 of middle section 13A is maximum along the normal to second main surface S2 of middle section 13A (with a straight line that includes this point and is parallel to extending direction D of second part 2b being represented by straight line A2: refer to FIG. 3). A plane parallel to extending direction D of second part 2b, which includes a straight line extending through this point along the normal direction to second main surface S2 of middle section 13A, is regarded as an interface (not shown). Among two regions of second extension section 13C which are separated by this interface, the area including second tip P2 corresponds to the second end part. Here, a maximum value of distance T13 is preferably greater than minimum distance T2 (refer to FIG. 2B) between second part 2b and second main surface S2 of middle section 13A. In this way, second part 2b is supported from below by the first end part and the second end part and thus can be reliably fixed.

Minimum distance T2 changes according to, for example, a size of capacitor element 10. It is preferable that anode terminal 13 is located at a position where second part 2b can be welded under no load. Each of first extension section 13B and second extension section 13C is bent only in one direction. In other words, each of first extension section 13B and second extension section 13C is bent only in such a direction that tip P1, P2 faces second main surface S2 of middle section 13A, first extension section 13B or second extension section 13C. With this way of bending, anode terminal 13 forms a simple ring shape (this includes cases where the ring is open). As such, a position of the point that is taken on first main surface S1 and where distance T13 is maximum can be easily adjusted achieved by changing respective bending degrees or respective longitudinal lengths of first extension section 13B and second extension section 13C. Anode terminal 13 that can be welded to second part 2b of anode lead 2 with no load on second part 2b can thus be obtained with ease. Consequently, connection reliability improves.

First main surface S1 may be formed to be planar or may be curved to have a projecting shape at the first end part as well as at the second end part. In either of the cases, second part 2b makes contact with valley V along lines extending in extending direction D of second part 2b. It is particularly preferable that first main surface S1 have the projecting shape at the first end part as well as at the second end part because contact area between second part 2b and anode terminal 13 can be easily made small. In this way, even when material used for anode terminal 13 is metal having high heat conductivity (such as copper) or metal that has a higher melting point than the material for anode lead 2, valley V and anode lead 2 can be reliably connected by welding. Valley V and anode lead 2 can be welded to each other, for example, by irradiating anode lead 2 with a laser beam.

First extension section 13B and second extension section 13C may abut each other or may be joined to each other at valley V. In either of the cases, first extension section 13B and second extension section 13C can be welded when valley V and anode lead 2 are welded to each other. In this case, the reliability of connection between valley V and anode lead 2 further improves because the bent shape of anode terminal 13 can be fixed. Tip P1 of the first end part and tip P2 of the second end part may abut on second main surface S2 of middle section 13A, first extension section 13B or second extension section 13C.

It is preferable that anode terminal 13 include first bend B1 (refer to FIG. 3) that is bent at or near a boundary between first extension section 13B and middle section 13A, and second bend B2 that is bent between first bend B1 and tip P1 of the first end part. It is also preferable that anode terminal 13 include first bend B1 that is bent at or near a boundary between second extension section 13C and middle section 13A, and second bend B2 that is bent between first bend B1 and tip P2 of the second end part. With this configuration, by changing a distance between first bend B1 and second bend B2, distance T13 can be easily adjusted.

Distance T13 can be also adjusted by changing bending angle θ (refer to FIG. 3) inside first bend B1. It is preferable that bending angle θ of first bend B1 is 60° or more. Since each of extensions 13B, 13C is bent from substantially flat middle section 13A at first bend B1, the bend of the conductor is likely to cause an increased load when bending angle θ is less than 60°. Bending angle θ is more preferably 80° or more, and it is particularly preferable that bending angle θ is 90° or more. It is also preferable that bending angle θ is 120° or less. According to the present exemplary embodiment, even when bending angle θ is 60° or more, distance T13 can be easily adjusted by changing a distance between first bend B1 and second bend B2 and, furthermore, by changing bending angle α (refer to FIG. 5A) inside second bend B2. It is to be noted that bending angle θ is an interior angle formed by a plane that connects first bend B1 and second bend B2 along second main surface S2 and first main surface S1 of middle section 13A (refer to FIGS. 5A to 5E).

While bending angle α is not particularly limited, it is preferable that bending angle α ranges from 60° to 120°, inclusive, because of a reduced load. Bending angle α is an interior angle formed by the plane that connects first bend B1 and second bend B2 along second main surface S2 and a plane that crosses straight line A1 (or A2) and makes contact with the first end part (or the second end part).

Figure 5A:
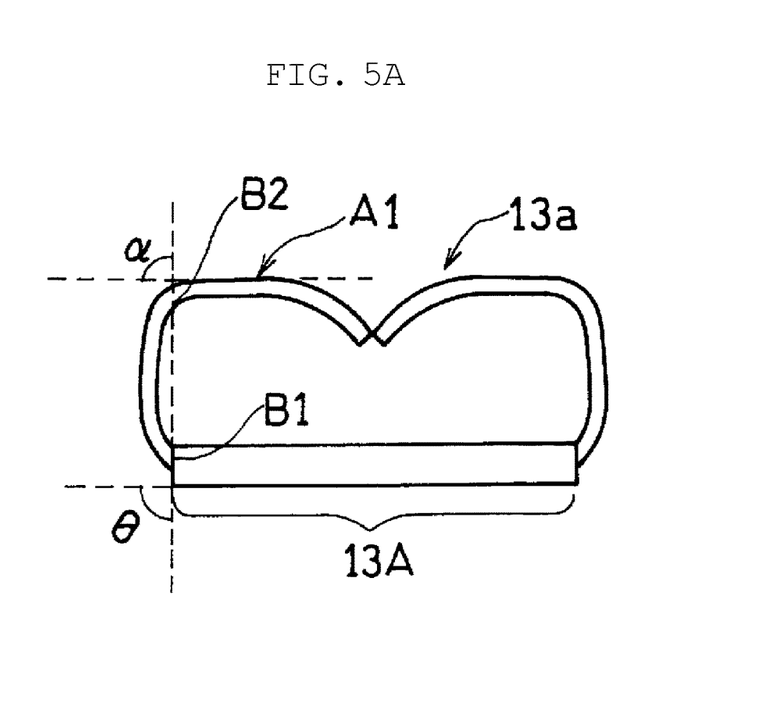
FIG. 5A is a side view illustrating another example of the anode terminal according to the exemplary embodiment of the present disclosure.

In the illustrated example, anode terminal 13 is bent in a substantially M shape with each of the first and second extension sections 13B, 13C extending to curve, but is not limited to this. The anode terminal may have such a shape as shown in FIG. 5A, 5B, 5C, 5D or 5E. In FIG. 5A, middle section 13A of anode terminal 13a has a greater thickness than first extension section 13B and second extension section 13C. In this case, a step may be formed at a boundary between middle section 13A and each of the first and second extension sections 13B, 13C. Still, anode terminal 13a has an outer surface as a first main surface of middle section 13A, the first extension section 13B, and the second extension section 13C and has an inner surface as a second main surface of middle section 13A, the first extension section 13B, and the second extension section 13C.

Figure 5B:
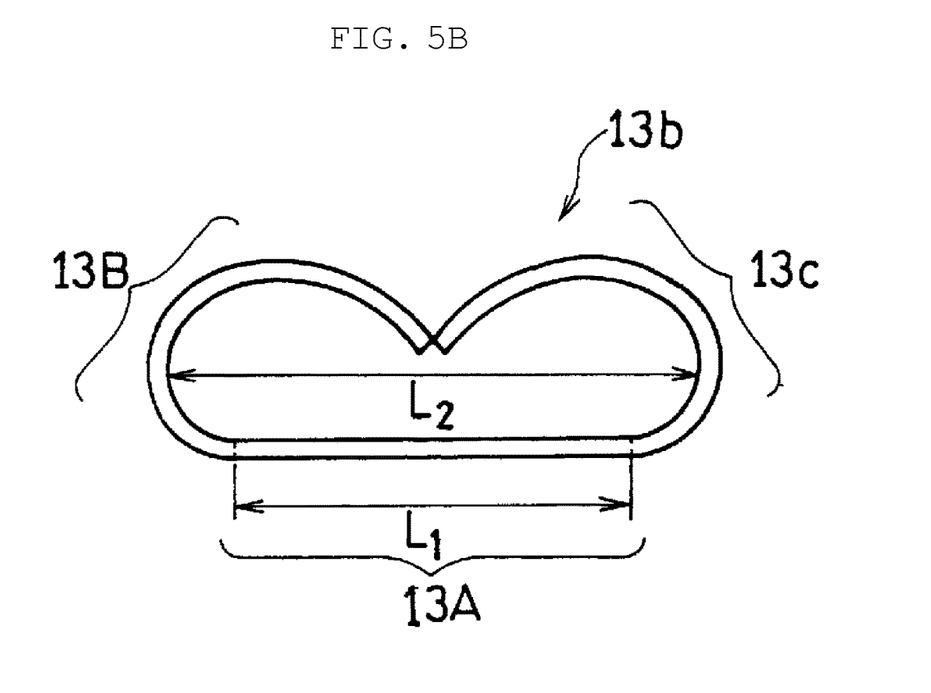
FIG. 5B is a side view illustrating another example of the anode terminal according to the exemplary embodiment of the present disclosure.

In FIG. 5B, anode terminal 13b does not include first bends and second bends. And the first and second extension sections 13B, 13C are bent in such a manner as to draw an ellipse or a circle. In this case, first extension section 13B and second extension section 13C are preferably bent so that a ratio (L2/L1) of distance L2 to longitudinal length L1 of middle section 13A is 1 or more because of a reduced load, L2 being a distance between a outermost point of first extension section 13B of a projecting shape and a outermost point of second extension section 13C of a projecting shape on second main surface S2 in a longitudinal direction of middle section 13A.

Figure 5C:
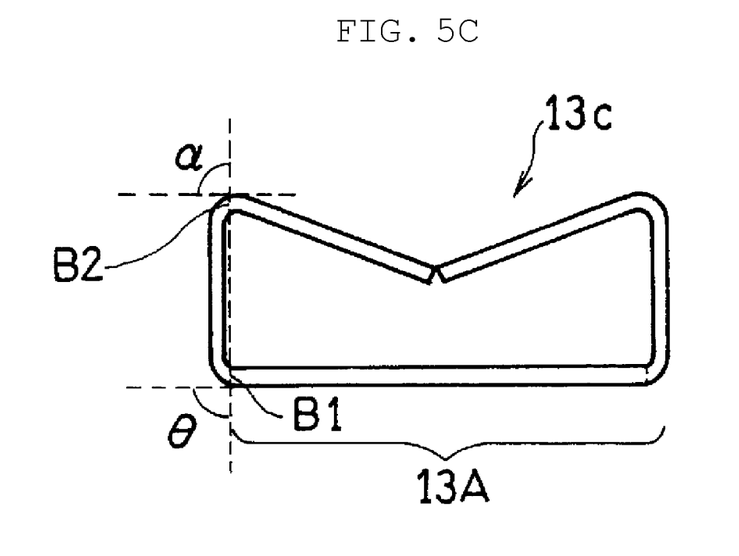
FIG. 5C is a side view illustrating another example of the anode terminal according to the exemplary embodiment of the present disclosure.
Figure 5D:
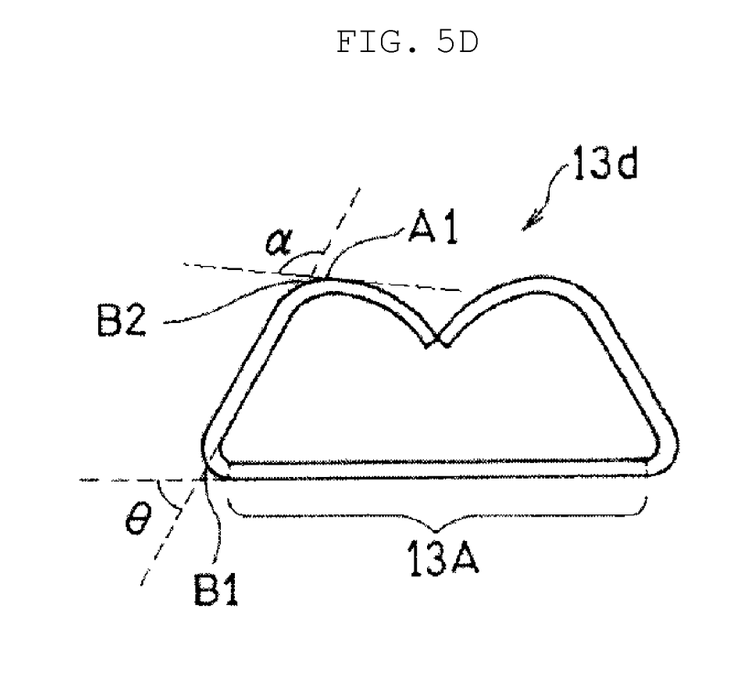
FIG. 5D is a side view illustrating another example of the anode terminal according to the exemplary embodiment of the present disclosure.
Figure 5E:
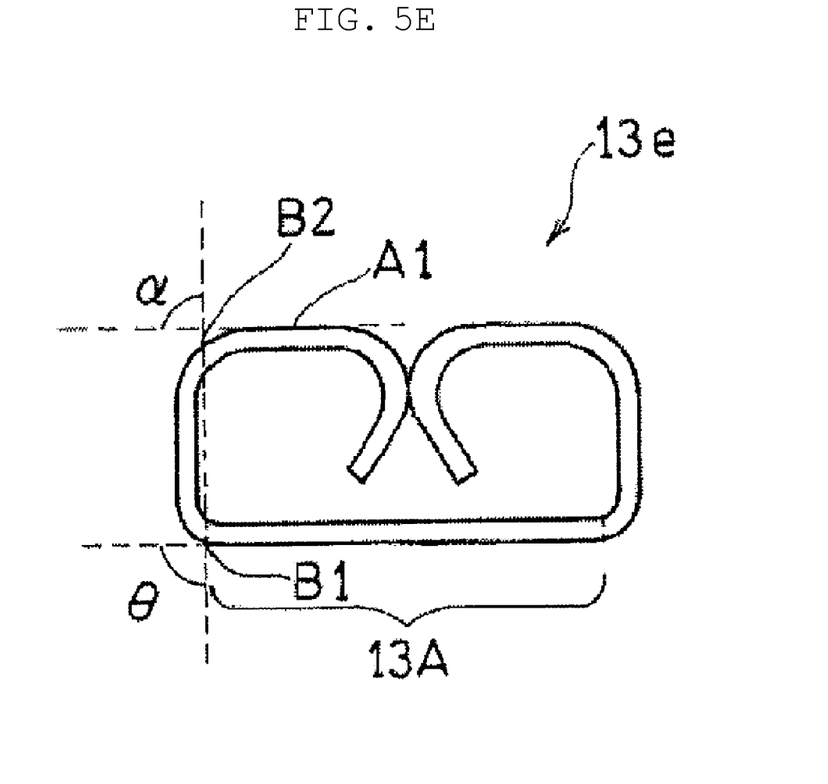
FIG. 5E is a side view illustrating another example of the anode terminal according to the exemplary embodiment of the present disclosure.

In a structure shown in FIG. 5C, a first main surface is planar at end parts of anode terminal 13c. In a structure shown in FIG. 5D, anode terminal 13d has bending angle θ of 60°. In a structure shown in FIG. 5E, end parts of anode terminal 13e have an upper valley that narrows toward middle section 13A, and a lower valley that widens toward middle section 13A. In this case, second part 2b may be joined to anode terminal 13e either at the upper valley or at the lower valley.

The material for the anode terminal is not particularly limited as long as the material is electrochemically and chemically stable and conductive (conductor). As such, the material for the anode terminal may be metal or nonmetal. Specific examples that can be given include an alloy of iron and nickel (such as 42 Alloy), and copper. While a thickness of the material (strip-shaped conductor before bending) used for the anode terminal is not particularly limited, this thickness preferably ranges from 25 μm to 200 μm, inclusive, and more preferably from 25 μm to 100 μm, inclusive, from the viewpoint of a lower profile and flexibility. A width (short-side length) of the strip-shaped conductor is not particularly limited as long as an area where second part 2b is joined can be ensured. As such, the width only needs to be sufficient for second part 2b of anode lead 2 to be positioned.

In the case of anode terminal 13 having first bends B1 and second bends B2, anode terminal 13 can be manufactured by a method including steps below. Anode terminal 13 that longitudinally has middle section 13A and two extension sections 13B, 13C disposed at two sides (both sides) of middle section 13A can be manufactured, for example, by the method described below. A first step is forming second bends B2 by bending the strip member, which has two first planned bending locations and two second planned bending locations, to preferably 60° or more at the second planned bending locations with first main surface S1 being outer. A second step is forming first bends B1 and middle section 13A by bending the strip member provided with second bends B2 to preferably 60° or more at the first planned bending locations with first main surface S1 being outer. And a third step is pressing down a jig (third jig A) that is brought into contact with at least respective parts of areas that each extend from second bend B2 to a tip of the strip member so that the tips face second main surface S2.

In the first step, second bends B2 are formed, for example, by pressing first jig A having a columnar projection that is as wide (or thick) as a length between second bends B2 of the strip member against second main surface S2 of the strip member, and pressing first jig B having a recess that is wider than first jig A by about twice the thickness of the strip member against first main surface S1 of the strip member at a position corresponding to first jig A.

In the second step, first bends B1 are formed, for example, by pressing second jig A having a projection that is as wide as a length between first bends B1 of the strip member against second main surface S2 of the strip member, and pressing second jig B having a recess that is wider than second jig A (or a longitudinal length of middle section 13A of the strip member) against first main surface S1 of the strip member at a position corresponding to second jig A. It is to be noted that bending angle θ of first bend B1 may be adjusted with a change of width of the recess of second jig B.

Final adjustment of bending angle θ can be achieved in the subsequent third step. In the third step, bending angle θ can be adjusted to about 90°, for example, by pressing third jig B having a recess that is as wide as the length between first bends B1 of the strip member plus about twice the thickness of the strip member against first main surface S1 of the strip member at a position corresponding to third jig A.

Anode terminal 13 can be manufactured by such an extremely simple method in which the strip member is unidirectional bent multiple times. According to this method, the distance between first bend B1 and second bend B2 or bending angle θ of first bend B1 can be adjusted in the second step, and distance T13 can be adjusted with ease in the third step by changing an amount by which third jig A is pressed down.

The first planned bending locations and the second planned bending locations may be provided with notches 15 (refer to FIGS. 4A and 4B) or guide lines (not shown). In this way, the strip-shaped conductor can be bent at the predetermined locations with ease. The strip member of predetermined shape is obtained by being stamped out from a plate-shaped conductor (conductor plate).

A solid electrolytic capacitor according to the present disclosure has excellent connection reliability and thus can be used for various applications.

What is claimed is:

1. A solid electrolytic capacitor comprising:
    a capacitor element including an anode portion and a cathode portion;
    an anode terminal electrically connected to the anode portion, the anode terminal having a first main surface and a second main surface opposite to the first main surface;
    a cathode terminal electrically connected to the cathode portion; and
    an exterior body covering the capacitor element and exposing at least a part of each of the anode terminal and the cathode terminal, wherein:
    the anode portion includes an anode body and an anode lead extending from the anode body,
    the anode terminal includes a middle section, a first extension section and a second extension section, the first extension section and the second extension section being respectively disposed at both sides of the middle section,
    the first main surface is exposed from the exterior body at the middle section,
    each of the first extension section and the second extension section extends from the middle section in a direction perpendicular to an extending direction of the anode lead,
    the first extension section has a first end part and is bent so that a tip of the first end part faces the second main surface,
    the second extension section has a second end part and is bent so that a tip of the second end part faces the second main surface,
    each of the first extension section and the second extension section extends so that the first end part and the second end part approach each other, and
    the anode lead connects with the first main surface of the anode terminal at the first end part and at the second end part.

2. The solid electrolytic capacitor according to claim 1, wherein a maximum value of distance between the first main surface of the first extension section and the second main surface of the middle section along a line normal to the second main surface of the middle section and a maximum value of distance between the first main surface of the second extension section and the second main surface of the middle section along the line normal to the second main surface of the middle section are each greater than a minimum distance between the anode lead and the second main surface of the middle section.

3. The solid electrolytic capacitor according to claim 1, wherein the first main surface has a projecting shape at the first end part and at the second end part.

4. The solid electrolytic capacitor according to claim 1, wherein:
    the anode terminal includes a pair of first bends and a pair of second bends,
    one of the pair of first bends is bent at a boundary between the first extension section and the middle section,
    the other of the pair of first bends is bent at a boundary between the second extension section and the middle section,
    one of the pair of second bends is bent between the tip of the first end part and the one of the pair of first bends, and
    the other of the pair of second bends is bent between the tip of the second end part and the other of the pair of first bends.

5. The solid electrolytic capacitor according to claim 4, wherein a bending angle of each of the pair of first bends ranges from 60° to 120°, inclusive.

6. The solid electrolytic capacitor according to claim 1, wherein the first end part and the second end part make contact with each other at the first main surface.

7. The solid electrolytic capacitor according to claim 1, wherein a first line extending normal to an end surface of the first end part and a second line extending normal to an end surface of the second end part intersect with one another.

8. A solid electrolytic capacitor comprising:
    a capacitor element including an anode portion and a cathode portion;
    an anode terminal electrically connected to the anode portion, the anode terminal having a first main surface and a second main surface opposite to the first main surface;
    a cathode terminal electrically connected to the cathode portion; and
    an exterior body covering the capacitor element and exposing at least a part of each of the anode terminal and the cathode terminal, wherein:
    the anode portion includes an anode body and an anode lead extending from the anode body,
    the anode terminal includes a middle section, a first extension section and a second extension section, the first extension section and the second extension section being respectively disposed at both sides of the middle section,
    the first main surface is exposed from the exterior body at the middle section,
    each of the first extension section and the second extension section extends from the middle section in a direction nonparallel with an extending direction of the anode lead,
    the first extension section has a first end part and is bent so that a tip of the first end part faces the second main surface,
    the second extension section has a second end part and is bent so that a tip of the second end part faces the second main surface,
    the anode terminal includes a pair of first bends and a pair of second bends,
    one of the pair of first bends is bent at a boundary between the first extension section and the middle section,
    the other of the pair of first bends is bent at a boundary between the second extension section and the middle section,
    one of the pair of second bends is bent between the tip of the first end part and the one of the pair of first bends, and
    the other of the pair of second bends is bent between the tip of the second end part and the other of the pair of first bends, and
    the anode lead connects with the first main surface of the anode terminal at the first end part and at the second end part.

9. The solid electrolytic capacitor according to claim 8, wherein a bending angle of each of the pair of first bends ranges from 60° to 120°, inclusive.

10. A solid electrolytic capacitor comprising:
    a capacitor element including an anode portion and a cathode portion;
    an anode terminal electrically connected to the anode portion, the anode terminal having a first main surface and a second main surface opposite to the first main surface;

a cathode terminal electrically connected to the cathode portion; and an exterior body covering the capacitor element and exposing at least a part of each of the anode terminal and the cathode terminal, wherein:

the anode portion includes an anode body and an anode lead extending from the anode body, the anode terminal includes a middle section, a first extension section and a second extension section, the first extension section and the second extension section being respectively disposed at both sides of the middle section, the first main surface is exposed from the exterior body at the middle section, each of the first extension section and the second extension section extends from the middle section in a direction nonparallel with an extending direction of the anode lead, the first extension section has a first end part and is bent so that a tip of the first end part faces the second main surface, the second extension section has a second end part and is bent so that a tip of the second end part faces the second main surface, the first end part and the second end part make contact with each other at the first main surface, and the anode lead connects with the first main surface of the anode terminal at the first end part and at the second end part.

\* \* \* \* \*